United States Patent
Hallam et al.

(10) Patent No.: US 9,807,234 B2
(45) Date of Patent: *Oct. 31, 2017

(54) DISASTER RELIEF EVENT CALL FLAGGING

(71) Applicant: BANK OF AMERICA CORPORATION, Charlotte, NC (US)

(72) Inventors: David Luke Hallam, Newark, DE (US); Andrew Sheldon, Mountain Top, PA (US); Aleksander F. Kravchenko, Tucson, AZ (US); George Vettiyedathuparampil Thomas, Trophy Club, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/159,105

(22) Filed: May 19, 2016

(65) Prior Publication Data

US 2016/0261746 A1    Sep. 8, 2016

Related U.S. Application Data

(63) Continuation of application No. 14/482,935, filed on Sep. 10, 2014, now Pat. No. 9,398,167.

(51) Int. Cl.
| | |
|---|---|
| *H04M 11/00* | (2006.01) |
| *H04M 3/51* | (2006.01) |
| *H04M 11/04* | (2006.01) |
| *G06F 3/0484* | (2013.01) |
| *G06Q 20/40* | (2012.01) |

(Continued)

(52) U.S. Cl.
CPC ........ *H04M 3/5158* (2013.01); *G06F 3/0484* (2013.01); *G06F 3/04842* (2013.01); *G06Q 20/407* (2013.01); *G06Q 30/01* (2013.01); *G06Q 30/016* (2013.01); *H04M 1/677* (2013.01); *H04M 11/04* (2013.01)

(58) Field of Classification Search
USPC .......................................................... 379/52
See application file for complete search history.

(56) References Cited

U.S. PATENT DOCUMENTS

| | | | | |
|---|---|---|---|---|
| 7,817,982 | B1 * | 10/2010 | Chu ..................... | G08B 27/006 379/45 |
| 2001/0033643 | A1 | 10/2001 | Mulvey et al. | |

(Continued)

*Primary Examiner* — Maria El-Zoobi
(74) *Attorney, Agent, or Firm* — Michael A. Springs; Moore & Van Allen PLLC; W. Kevin Ransom

(57) ABSTRACT

Embodiments of the invention relate to systems, methods, and computer program products for providing disaster relief event call flagging. The system, method, and computer program product are configured to create a disaster relief event associated with a plurality of customer accounts maintained by an entity, wherein the disaster relief event comprises one or more parameters that identify locations associated with the disaster relief event; create a temporary dialer file for use in contacting the plurality of customers in reference to the accounts, wherein the dialer file is based at least partially on the one or more parameters of the disaster relief event, and automatically suspend contact to one or more customers based at least partially in response to the telephone numbers of the one or more customer being excluded from the temporary dialer file.

18 Claims, 8 Drawing Sheets

(51) Int. Cl.
G06Q 30/00 (2012.01)
H04M 1/677 (2006.01)

(56) References Cited

U.S. PATENT DOCUMENTS

| | | | |
|---|---|---|---|
| 2011/0128144 A1* | 6/2011 | Baron, Sr. | G01W 1/00 340/539.3 |
| 2013/0157610 A1* | 6/2013 | Vainik | G06F 11/0781 455/404.1 |
| 2014/0120885 A1 | 5/2014 | Luneau | |
| 2014/0310191 A1 | 10/2014 | Schobel | |
| 2015/0127396 A1 | 5/2015 | Sheldon et al. | |
| 2015/0244872 A1* | 8/2015 | Hoover | H04M 11/04 379/45 |
| 2016/0261745 A1 | 9/2016 | Hallam et al. | |

* cited by examiner

FIG. 2

QUEUE EXPLORER\SEARCH QUEUES \ DISASTER RELIEF EVENT \ DISASTER RELIEF LIST \ DRE Q&A NOT PREVENTED \ DRE CR ZIP, AREA, S, OLQ - NO

EVENT NAME [____]  EVENT END DATE [04/04/2014]  [UPDATE ALL]

PREVENT CALLING FOR CONSUMER AND   UTD☑  5☑  30☑  60☑  90☑  120☑  150☑  180+☑
SMALL BUSINESS CARD
PREVENT CALLING ALL OTHER PRODUCTS  YES ▷

DESCRIPTION [_____]

CALL CENTER MESSAGE
DISCLOSURE NAME [_____] ▷ DISCLOSURE MUST BE CREATED PRIOR TO CREATION OF DRE  [REFRESH]

STATE OR POSTAL OR AREA CODES
| DELETE | DISASTER CODE TYPE | DISASTER CODE | START DATE | END DATE | LAST DATE | LAST BY |

[ADD]  [IMPORT]

LAST MODIFIED BY [____]  LAST MODIFIED DATE [____]  [DELETE ALL]

[SAVE]

| QUEUE EXPLORER | SEARCH QUEUES | DRE HURRICANE | DISASTER RELIEF LIST | DRE OCA NOT PREVENTED | DRE CR ZIP, AREA St, OLQ - NO |

EVENT NAME [OCA NOT PRVENTED]    EVENT END DATE [04/04/2014]

PREVENT CALLING FOR CONSUMER AND SMALL BUSINESS CARD   UTD ☒   5 ☒   30 ☒   60 ☒   90 ☒   120 ☒   150 ☒   180+ ☒

PREVENT CALLING ALL OTHER PRODUCTS   [YES ▷]

DESCRIPTION   [STATE   ZIP CODE   PHONE NUMBER]

CALL CENTER MESSAGE

DISCLOSURE NAME [CPS INITIAL PAYMENT AFTER CLOSING ▷]   DISCLOSURE MUST BE CREATED PRIOR TO CREATION OF DRE   [REFRESH]

[UPDATE ALL]

STATE OR POSTAL OR AREA CODES

[IMPORT]

| DELETE | DISASTER CODE TYPE | DISASTER CODE | START DATE | END DATE | LAST DATE | LAST BY |
|---|---|---|---|---|---|---|
| ✕ | STATE CODE | STATE | 02/06/2014 | 03/23/2014 | 02/06/2014 | USER |
| ✕ | POSTAL CODE | ZIP CODE | 02/06/2014 | 03/23/2014 | 02/06/2014 | |
| ✕ | AREA CODE | AREA CODE | 02/06/2014 | 03/23/2014 | 02/06/2014 | |

DISASTER RELIEF EVENT CALL FLAGGING

CROSS-REFERENCE TO RELATED APPLICATIONS

This application is a continuation of U.S. patent application Ser. No. 14/482,935, filed Sep. 10, 2014, of the same title, the entirety of which is incorporated herein by reference.

BACKGROUND

In 1991, the Telephone Consumer Protection Act (TCPA) was passed by the United Stated Congress and signed into law. One provision of the TCPA prevents automated telephone equipment from dialing any telephone number assigned to a paging service, cellular telephone service, specialized mobile radio service, or other radio common carrier service, or any service for which the called party is charged for the call without the prior express consent of the called party. Thus, there is a need for a system to determine whether an entity has permission to contact a customer via automated telephone equipment.

SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention relate to apparatuses, methods, and computer program products for providing disaster relief event call flagging. An exemplary system may comprise a computer apparatus including a processor and a memory, and a software module stored in the memory, comprising executable instructions that when executed by the processor cause the processor to create a disaster relief event associated with a plurality of customer accounts maintained by an entity, where the disaster relief event comprises one or more parameters that identify locations associated with the disaster relief event. The system may then create a temporary dialer file for use in contacting the plurality of customers in reference to the accounts, where the dialer file is based at least partially on the one or more parameters of the disaster relief event. Creating the dialer file may comprise determining to exclude a telephone number from the dialer file in response to determining the telephone number is associated with the disaster relief event, and determining to exclude a telephone number from the dialer file in response to determining the account related to the telephone number is associated with the disaster relief event. In response to creating the temporary dialer file, the system may automatically suspend contact to one or more customers based at least partially in response to the telephone numbers of the one or more customer being excluded from the temporary dialer file.

In some embodiments, the system is further configured to determine to not automatically suspend contact to one or more customers based at least partially the delinquency stage or product type of the one or more customer accounts.

In some embodiments, determining to not automatically suspend contact to one or more customers based at least partially the delinquency stage or product type of the one or more customer accounts further comprises the system being configure to determine to not exclude a telephone number from the dialer file in response to determining the account related to the telephone number is a predetermined number of days in payment arrears or associated with a predetermined product type.

In some embodiments, the system is further configured to present, to a user, a warning message associated with the disaster relief event, wherein the warning message indicates at least one customer telephone number or account has been associated with the disaster relief event, and wherein the warning is presented on a user interface associated with the user.

In some embodiments, the warning message is configured to allow the user to request, via the user interface, to receive additional information related to the disaster relief event, acknowledge, via the user interface, that the warning was received, override, via the user interface, the warning message and not automatically suspend contact to one or more customers, or manually select, via the user interface, to automatically suspend contact to one or more customers.

In some embodiments, the customer has a first and second account maintained by the entity, where the disaster relief event is only associated with the first account such that automatically suspending contact to the customer on behalf of the entity comprises determining to not contact a customer based at least partially on determining the reason for contacting the customer is associated with the first account; and determining to contact a customer based at least partially on determining the reason for contacting the customer is associated with the second account.

In some embodiments, the entity contacts the customer using an automated dialer, where automatically suspending contact to the customer on behalf of the entity comprises blocking the automated dialer from dialing one or more telephone numbers associated with the customer.

In some embodiments, a dialer file comprising the one or more telephone numbers associated with the customer is stored in the memory, where creating the temporary dialer file comprises removing one or more telephone numbers from the dialer file such that after removing the one or more telephone numbers from the dialer file the plurality of customers cannot be contacted at the one or more telephone numbers on behalf of the entity.

In some embodiments, the system is configured to provide a user interface for creating the disaster relief event, and wherein the user interface is configured to automatically import information into at least one user input field within a user interface, and wherein the imported information is in an aggregated format.

In some embodiments, the system is further configured to receive, via user input into a user interface, a request to delete the disaster relief event associated with a customer having the at least one account maintained by an entity; and in response to receiving the request to delete the disaster relief event, automatically initiate contact to the customer on behalf of the entity.

The features, functions, and advantages that have been discussed may be achieved independently in various embodiments of the present invention or may be combined with yet other embodiments, further details of which can be seen with reference to the following description and drawings. Additionally, as will be appreciated by one of ordinary skill in the art, the features, functions, and advantages that have been discussed may include and/or be embodied as an apparatus (including, for example, a system, machine, device, computer program product, and/or the like), as a method (including, for example, a business method, computer-implemented process, and/or the like), or as any combination of the foregoing.

BRIEF DESCRIPTION OF THE DRAWINGS

Figure 1:
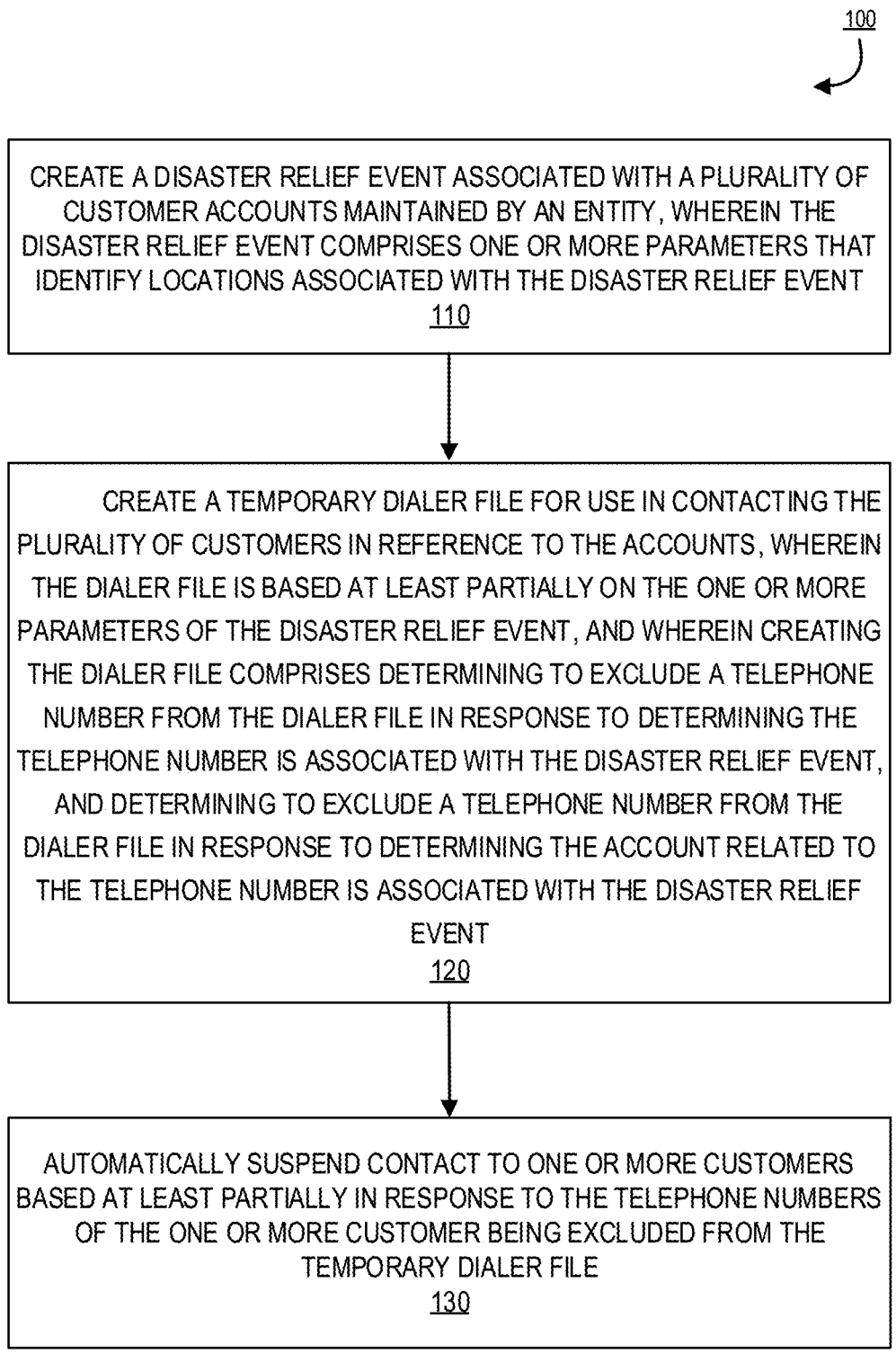
Figure 4:
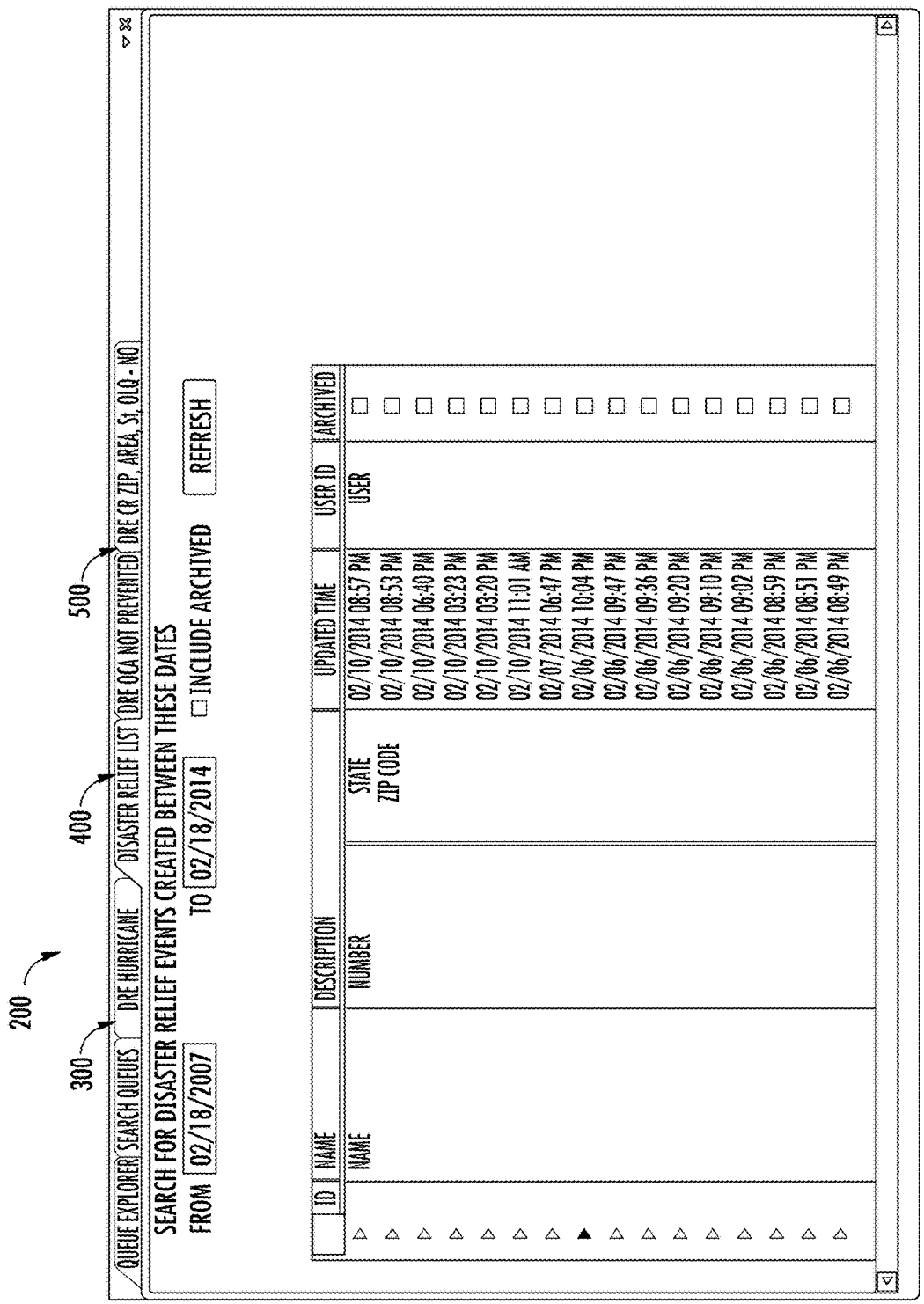
Figure 7:
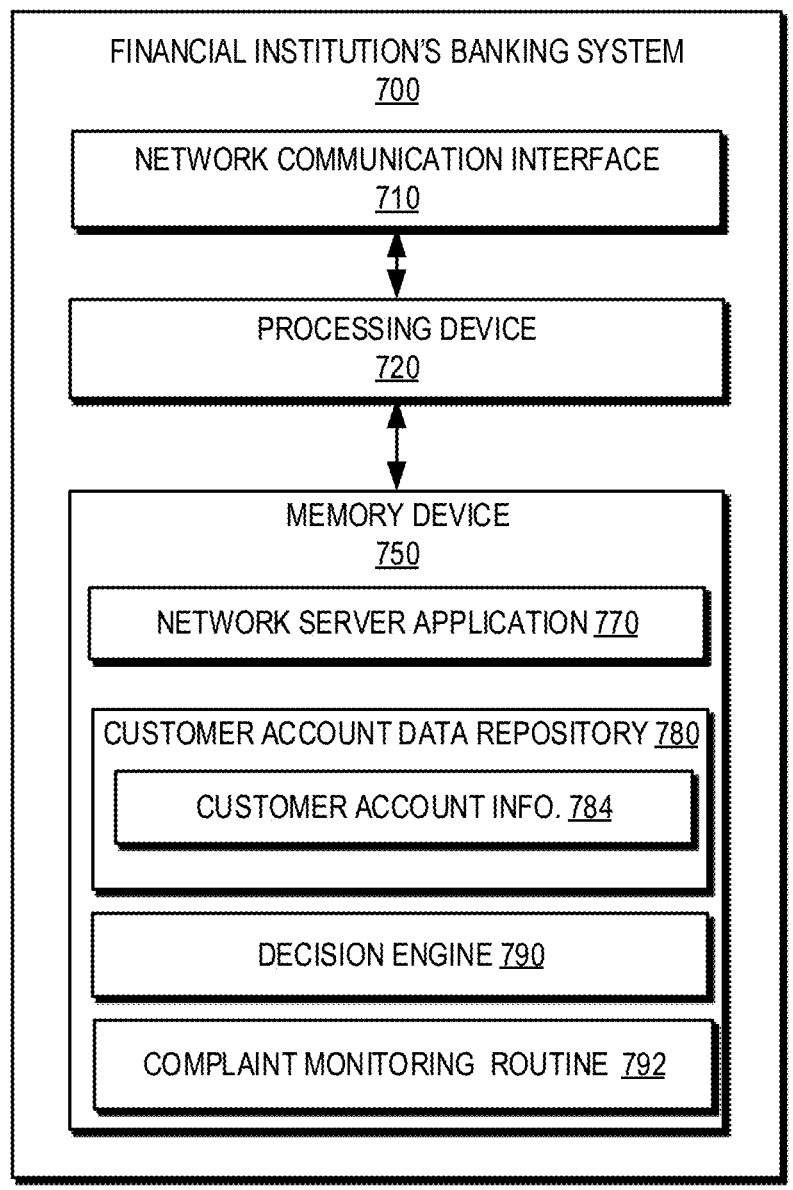
Figure 8:
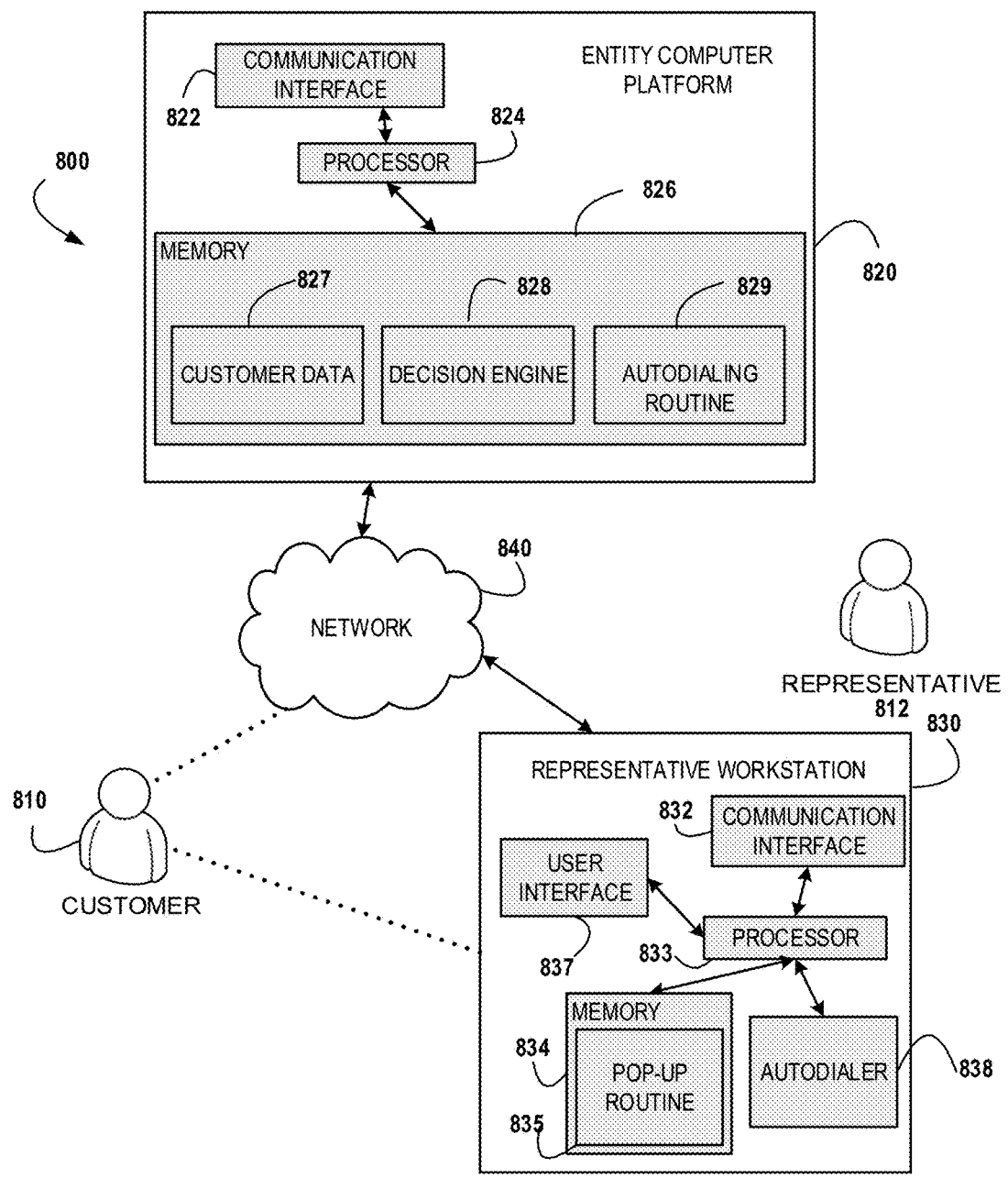

Having thus described embodiments of the invention in general terms, reference will now be made to the accompanying drawings, which are not necessarily drawn to scale, and wherein:

FIG. 1 provides a high level process flow illustrating the unified recovery process, in accordance with one embodiment of the present disclosure;

FIG. 2 is an exemplary screenshot of a graphical representation of user interface for creating disaster relief events, in accordance with one embodiment of the present disclosure;

FIG. 3 is an exemplary screenshot of a graphical representation of user interface for creating disaster relief events, in accordance with one embodiment of the present disclosure;

FIG. 4 is an exemplary screenshot of a graphical representation of user interface for searching disaster relief events, in accordance with one embodiment of the present disclosure;

Figure 5:
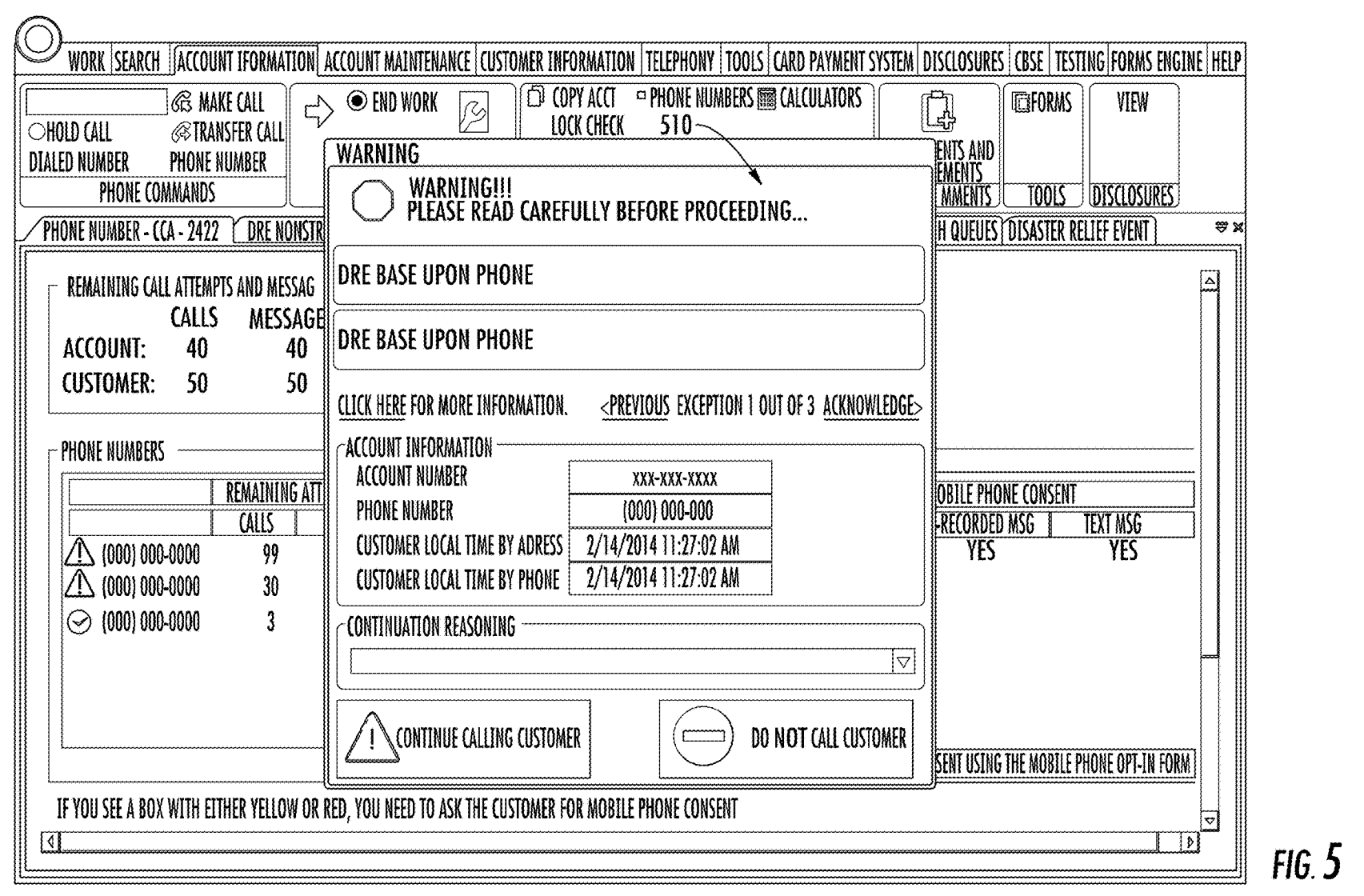

FIG. 5 is an exemplary screenshot of a graphical representation of a primary information screen for a customer, in accordance with one embodiment of the present disclosure;

Figure 6:
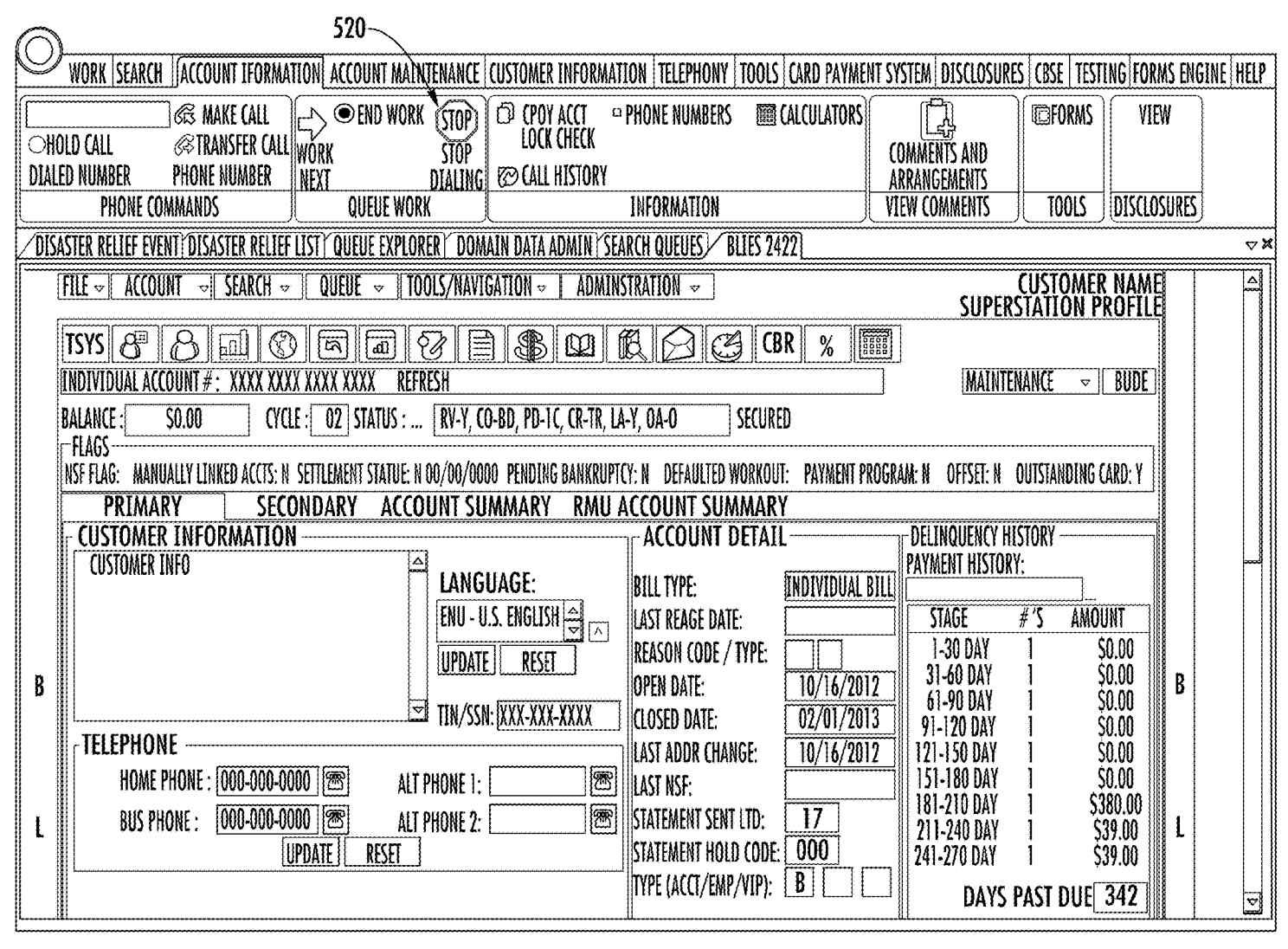

FIG. 6 is an exemplary screenshot of a graphical representation of a primary information screen for a customer, in accordance with embodiments of the disclosure;

FIG. 7 is a block diagram illustrating exemplary technical components of a financial institution banking system, in accordance with an embodiment of the present disclosure; and FIG. 8 is a block diagram of an environment for implementing a system to determine permission to contact, in accordance with an embodiment of the present disclosure.

DETAILED DESCRIPTION OF EMBODIMENTS OF THE INVENTION

Embodiments of the present disclosure now may be described more fully hereinafter with reference to the accompanying drawings, in which some, but not all, embodiments of the disclosure are shown. Indeed, many different forms may be possible and the disclosure should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." It should also be understood that while some embodiments describe the methods or products as comprising one or more elements, the methods or elements may also consist of or consist essentially of the elements disclosed herein.

Furthermore, the term "product" or "account" as used herein may include any financial product, service, or the like that may be provided to a customer from an entity that subsequently requires payment. A product may include an account, credit, loans, purchases, agreements, or the like between an entity and a customer. The term "relationship" as used herein may refer to any products, communications, correspondences, information, or the like associated with a customer that may be obtained by an entity while working with a customer. Customer relationship data may include, but is not limited to addresses associated with a customer, customer contact information, customer associate information, customer products, customer products in arrears, or other information associated with the customer's one or more accounts, loans, products, purchases, agreements, or contracts that a customer may have with the entity.

Although embodiments of the present invention described herein are generally described as involving an entity, it will be understood that entity may involve one or more persons, organizations, businesses, institutions and/or other entities such as financial institutions, that implement one or more portions of one or more of the embodiments described and/or contemplated herein.

Thus, apparatus, systems, methods and computer program products are herein disclosed for implementing disaster relief call flagging. Inasmuch as financial institutions often contact customers to discuss accounts and/or offer new products, specific embodiments disclosed herein relate to financial institutions. However, such embodiments are exemplary.

The present invention may be used in conjunction with a unified recovery system where the system is configured to create disaster relief events associated with customer communications related to the unified recovery system. The system may compile various recovery programs across an entity. In this way, all recovery programs may be centralized, such that the representative can log into a single system. This eliminates requiring the representative to log into a plurality of software programs in order to view and understand all relationships a customer has with the entity.

The system may determine regulations and internal restrictions associated with individual customer communications. Regulations may include laws or other regulations regarding the time of day a customer may be contacted, the amount of times within a given day/week/month that a customer may be contacted, a telephone number in which a customer may be contacted, or the like. As such, the system ensures that the representative is following all regulations and/or laws regarding the contacting of customers with products having payments in arrears. Internal regulations may include any rule that an entity may put in place to restrict or warn a representative prior to the representative contacting a customer or during the representative's communication with the customer. For example, an internal regulation may be set based on a customer communication preference, such as a specific telephone number to utilize for communications with the customer. In another example, the entity may identify an event that requires the entity to delay in communicating with a customer regarding a product with a payment in arrears (e.g., a natural disaster in the geographic are where the customer is located or another known event that may interfere with a customer providing payment).

In some embodiments, the regulations or restrictions may, in some instances, be overridden by the representative. In this way, the representative may still contact the customer even if a regulation or restriction is in place. The representative may need to input a reason for overriding the regulation or restriction. In some embodiments, the regulation or restriction may not be overridden by any representative. In this way, the system will not allow the representative to communicate with the customer at that time. In some embodiments, no regulation or restriction may be placed on a customer communication. As such, the representative may contact the customer at any time.

The system may utilize the regulations and restrictions to create rules for customer communications. These rules may be created and applied to a customer on a customer-by-customer basis. In this way, each customer, based on the customer's location, telephone number, or the like, may have a unique set of rules applied for him/her based on regulations and/or restrictions that may apply to the customer having payments in arrears for products. Once the rules have been created and applied, the determined rules may be correlated with each individual customer having payments in arrears. In some embodiments, the system to determine permission to contact is also used to determine rules for when a customer may be contacted.

The system may provide a unified application 200 for displaying a customer relationship to an appropriate representative. The unified application 200 has specific regulations, restrictions, and prior customer correspondence associated therewith. An appropriate representative may be identified by the system based on which representative has experience with that particular customer, knowledge with a particular account in arrears, or general expertise regarding a field associated with the primary account for recovery. The system may identify and match the customer with the appropriate representative based on these factors.

The system may allow the representative to initiate a communication with the customer. Allowing the representative to initiate a communication with a customer may be based on the determined regulations and restrictions. In some embodiments, the regulations and restrictions will not allow a representative to communicate with the customer. In some embodiments, the regulations and restrictions will warn against communicating with the customer. However, a representative may be able to override the warning. In some embodiments, the regulations and restrictions will allow a representative to communicate with the customer.

The system may track and store details regarding the customer communications. In this way, the system may track the disposition of the communication, such as determining if a communication was answered by the customer, a busy signal was received, or that the customer answered the communication. The system may identify the date, time, means of communication (such as specific telephone number, email address, or the like). Furthermore, the system may store any comments or notes made by the representative during the communications.

Method for Providing Disaster Relief Event Call Flagging

Referring now to FIG. 1, a general process flow 100 is provided for altering customer contact procedures whereby the customer is associated with a disaster relief event. In some embodiments, the process flow 100 is performed by a system (i.e., one or more apparatuses) having hardware and/or software configured to perform one or more portions of the process flow 100. In such embodiments, as represented by block 110, the system is configured to create a disaster relief event associated with a plurality of customer accounts maintained by an entity. The disaster relief event may comprise parameters (e.g. states, postal codes, area codes, and the like) that identify locations associated with the disaster relief event. As represented by block 120, the system is also configured to create a temporary dialer file for use in contacting the plurality of customers in reference to the accounts, the dialer file being based at least partially on the one or more parameters of the disaster relief event. As represented by block 130, in response to the creation of the temporary dialer file, the system is also configured to automatically suspend contact to one or more customers based at least partially in response to the telephone numbers of the one or more customer being excluded from the temporary dialer file.

It will be understood that the system having the process flow 100 can include one or more separate and/or different apparatuses. For example, in some embodiments of the invention, a single apparatus (e.g., entity computing platform 820 described in connection with FIG. 8) is configured to perform all of the portions of process flow 100 represented by blocks 110 to 130. However, in some other embodiments, a first apparatus (e.g., entity computing platform 820 described in connection with FIG. 8) is configured to perform the portions of process flow 100 represented by blocks 120 and a second apparatus (e.g., representative workstation 830 described in connection with FIG. 8) is configured to perform the portions of process flow 100 represented by block and 110 and 130.

Regarding block 110, the phrase "disaster relief event" may refer to initiating and/or implementing specialized contact procedures for contacting customers and/or initiating contact in relation to customer accounts which have been determined to be associated with one or more instances of disaster relief efforts in a particular region. The disaster relief event may be further associated with any written and/or verbal annotations that identify an instance of disaster relief efforts in a particular region. The disaster relief event may be created by an authorized third party entity, or created by the entity responsible for contacting the customer.

The disaster relief event may be related to customer accounts that have one or more payments in arrears with the entity such that the disaster relief events may be created via a user interface associated with a unified recovery system, and in particular a unified application 200 to aid in payment in arrears recovery. Prior to providing the user interface for creating disaster relief events the system may first identify customer relationships across an entity. In this way, the system may identify all products that a customer may have with the entity across one or more lines of business within the entity. As such, addresses, affiliates, phone numbers, customer products, products with payments that are in arrears and any other information associated with a single customer may be gathered across the lines of business of an entity. The data associated with the customer relationships may be collected and compiled in association with the customer. All relationship data may be stored in association with the customer including those products and/or accounts that are in arrears. The products and/or accounts that have payments in arrears that are associated with that particular customer are then identified. A product or account with a payment in arrears may be qualified as being in arrears based on the entity itself and/or agreements for payment between the customer and the entity. For example, after the due date for payment for the product or after a predetermined number of days after the due date, the product may be considered by the entity to be in arrears. Furthermore, the accounts or products with payments in arrears for people affiliated with that customer, such as when the customer is a guarantor for the associate or the like, may also be identified by the system. People affiliated with the customer may include friends, family, or the like associated with the customer.

Further concerning block 110, the system may then provide a unified application 200 to a representative of the entity for customer communications. The unified application 200 provides the representative with an across the entity view of the customer's relationship with the entity as well as information associated with the primary account and other accounts with payments in arrears. The unified application 200 may further provide a user interface for creating disaster relief events to be associated with the customer account-related communications. In some embodiments, providing a user interface for creating disaster relief events to be associated with the customer account-related communications may further comprise presenting a graphical user interface (GUI) for creating disaster relief events on a workstation of the entity representative. The representative may then be able to interact with the user interface for the purpose of creating disaster relief events to be associated with the customer account-related communications. In an exemplary embodiment the user interface for creating disaster relief events may be directly launched from within the unified application 200 provided to the user. In this way, the unified application 200 may comprise one or more option tabs for selection, where the option tabs may indicate different users interfaces, forms, and/or reporting tools that are available to the representative from within the unified application 200. For example, as illustrated in FIG. 2 through FIG. 6, the option tabs for selection may include, but not be limited to, a queue explorer tab, a domain data administration tab, a search queues tab, one or more customer profile tabs, one or more customer contact preferences tab, a disaster relief event tab 300, a disaster relief list tab 400, one or more disaster relief event related tabs 500 and the like. It should be noted that any options that are selectable via tabs presented within the unified application 200, may additionally be selectable by others means not contemplated herein, including but not limited to, buttons, voice commands, text commands, and the like.

In an exemplary embodiment, the user interface for creating disaster relief events is directly related to the disaster relief event form and/or tab 300 such that in response to selecting the disaster relief event tab 300 a plurality of subsidiary input fields are presented within the user interface for the purpose of creating an instance of a disaster relief event. After creating a disaster relief event, one or more additional disaster relief event related tabs may be populated within the unified application 200, where each tab is either associated with an individual instance of a disaster relief event location or associated with specific contact procedures related to a plurality of disaster relief event locations. For example, as illustrated in FIG. 2 through FIG. 4, four additional disaster relief event related tabs 500 are populated within the unified application (e.g. "DRE OCA Not prevented", "DRE CR Zip, Area, St, DLQ—HO", "DRE NON-STRATGY DLQ 1", and "DRE BL, State, Area, Zip, DLQ on DRE"). In some embodiments, information presented within the additional tabs 500 may be independent of one another, and in other embodiments information presented within the additional tabs may be interrelated. In the primary disaster relief tab, the information may be related to one or more disaster relief events. In this way, the representative may add and/or remove disaster relief events that are presented on the user interface based on the related disaster relief efforts as they potentially change. The removal of a specific disaster relief event may subsequently result in the automatic removal of the additional tab related to a specific disaster relief event. For example, disaster relief events in a specific State, Area, and or Zip code region may end such that personnel associated with the entity may select to edit and/or remove the disaster relief event from within the disaster relief event tab 300, resulting in the additional disaster relief event related tab also being removed from the unified application 200.

Further concerning block 110, in response to selecting the disaster relief tab and/or option 300 from within the unified application 200, the system may then present the user interface for creating disaster relief events to be associated with customer account related communications. The disaster relief event may comprise one or more parameters that identify locations and/or regions associated with the disaster relief event. In an exemplary embodiment, the disaster relief event is further associated with and/or related to customer accounts which have financial agreements established on behalf of the customer between a financial institution and/or an entity. In some embodiments, receiving information via the user interface and/or form for creating disaster relief events 300 may further comprise manually receiving information into one or more user input fields within the user interface and/or form for creating disaster relief events 300. For example, information received in the manual input fields may include event name, event end date, event descriptions, other event parameters, and the like. Information within the user input fields may be populated based on user input from a representative associated with the entity responsible for maintaining the customer accounts. The received information may be directly inputted into the user interface that is being presented on the representative's workstation. The received information may typically be provided via one or more user input devices associated with the representative's workstation. The user interface may indicate the type and/or categories of information that may be received, where a portion of the information may be required, and a portion of the information may be optional. Methods for receiving information may include, but not be limited to, manually inputting information into the user interface and/or form using an input device, manually selecting options from one or more drop down menus, manually selecting yes or no options using selectable input methods (e.g. radio buttons, check boxes), and the like.

In an exemplary embodiment the user interface for creating disaster relief events is embodied by a form presented from within the unified application 200 and configured to receive information related to a particular instance of disaster relief efforts. For example, as illustrated in FIG. 2 through FIG. 4, the disaster relief event form 300 and/or user interface may be configured to receive information via various input fields such as the event name, event end date, event description, disclosure names, last modified by name, last modified date and the like. The disaster relief event form 300 and/or user interface may be configured to alter information within the form via various buttons and/or options such as options to update all information, refresh information, initiate import of information, delete or a subset of information, save information, and the like.

The disaster relief event form 300 and/or user interface may additionally be configured to receive information via various polling buttons and/or drop down menus such as poll buttons for reporting whether or not to prevent calling for consumers and small business cards that are up-to-date (UTD), or a certain number or days in arrears and down menus for reporting whether or not to prevent communication relate to all products. In this way, the user interface may comprise functionality that allows an individual creating the disaster relief event to customize the systems adherence to the disaster relief event based at least partially on the delinquency stage (e.g. 30+ days in arrears, 60+ days in arrears, 90+ days in arrears, and the like) or product type (e.g. credit card, mortgage, small business loan, and the like) of the customer account. For example, if a first customer is two payments behind, and a second customer is six payments behind, the system may determine to contact the customer that is six payments behind despite the creation of a disaster relief event that attempts to suspend contact to the customer. In this way, if it is determined that the system should still initiate contact to the customer, despite the contact procedures that have been implemented on behalf of the disaster relief event, the system may opt to skip one or more steps that are discussed herein to prevent calling customer during the disaster relief event (e.g. removing the customers number from a temporary dialer file).

In some embodiments, information such as the last modified by name and last modified date may be automatically populated within the form by the system. As such, receiving information via the user interface and/or form for creating disaster relief events 300 may further comprise automatically populating one or more information fields within the user interface and/or form for creating disaster relief events 300. In this way, a user may alter information on the disaster relief event form 300 such that the information related to the user that modified the form and the last time the information was modified is automatically populated within the form. In some embodiments, a primary description associated with the disaster relief event is provided at the top of the disaster relief event form such that the information provided in the description is extracted and automatically populated and/or prefilled into other user input fields for which the user has not yet provided specified information related to the disaster relief event. For example, if the user provides a description of the disaster relief event that includes information pertinent to the state, postal code, and/or area code associated with the event, information related to the state, postal, and/or area code may be automatically identified within the description text and extracted and imported into at least one other empty user input field within the form. The fields may be populated based on one more standards or rules that are provided by the business entity responsible for maintaining the unified application 200. In some embodiments, the field is partially populated based on one or more options presented within a drop down menu in the user interface and/or form for creating disaster relief events 300.

In some embodiments, information may be automatically uploaded and/or imported to the system in an aggregate form for the creation of one or more disaster relief events. For example, a line of business call center may receive a list of zip codes that have been impacted by a disaster. When creating the disaster relief event the system may be configured to receive a mass number of zip codes that have been impacted by the disaster relief event and upload the plurality of zip codes to the system, and more specifically the user interface associated with the disaster relief event, as opposed to a user manually entering each zip code on a single basis into the user interface associated with creating the disaster relief event.

In some embodiments, the disaster relief event description may be presented to a general population of individuals within the business entity. In this way, the event description may be customizable by the individual that created the disaster relief event. An individual may enter customizable text to be presented to representatives when populating information related to the disaster relief event on a multitude of representative workstations. For example, a user may create a disaster relief event and customize the description to state "A hurricane warning has been issued for State A, the customer should not be contacted during this time period", as such when the customer account is presented to the representative a notification displaying the customized event description may additionally be treated to the representative.

The disaster relief event form 300 and/or user interface may additionally be configured to receive information via various import and/or manual entry method menus such as importing information regarding disaster related state or postal/area codes or manually adding information related to disaster code type, disaster codes, start dates, end date, and the like. In some embodiments, receiving information via the user interface and/or form for creating disaster relief events 400 may further comprise importing information into one or more information fields within the user interface and/or form by populating the fields based on information that is available to the business entity and either stored locally or remotely accessible by the system for the purpose of importing the information into the user interface and/or form for creating disaster relief events 400. For example, various items of required information may be known to the system based on third party databases or the like responsible for reporting disaster relief efforts (e.g. state codes, postal codes, area codes, and the like). As such, the system may access the information known to the system and import at least portion of the information into the user interface and/or form for creating disaster relief events 400.

In some embodiments, receiving information within the user interface and/or form for creating disaster relief events 300 may further comprise verifying the received information for accuracy and completion. In such an embodiment, the system may have pre-defined criteria for information that must be explicitly provided by the user such as the event name and event end date. As such, the system may be further configured to review the received information provided via user input to verify that each item of required information has been provided. In an instance where one or more items of required information are determined to be missing from the form, the system may then be configured to present an error message (in an instance where the user attempts to submit and/or save the disaster relief event prior to providing the missing information) and further prompt the requesting entity to provide the missing items of information prior to submitting and/or saving the disaster relief event. In some embodiments, the disaster relief event is created in response to the user saving the user input provided within the user interface such that the event will not be created until the missing items of required information have been provided. The system may be further configured to review the received disaster relief event to verify that each item of required information is accurate. For example, the system may verify that the inputted disaster codes and/or area codes are parameters of valid disaster types and locations. In an instance where one or more items of required information are determined to be invalid, the system may then be configured to present an error message (in an instance where the user attempts to submit and/or save the disaster relief event prior to providing valid information) and further prompt the requesting entity provide the invalid items of information prior to submitting and/or saving the disaster relief event.

In some embodiments, authorization to create a disaster relief event may be based on the system user's administration rights. For example, a user with administrative rights (e.g. business line manager) may have access to create, view, edit, and delete disaster relief events. Likewise a system user without administrative (e.g. business line call center representative) rights may have limited functionality to interact with disaster relief events. For example, the representative may be limited to only being able to view details of a particular disaster relief event but unable to create the disaster relief events, edit details of the event, or delete a disaster relief event. In this way, the system may be configured to determine whether or not user has access or authorization to create a disaster relief event and perform various additional functions discussed herein, and further configured to block users that are unauthorized from creating, editing, and deleting disaster relief events.

Regarding block 120, after creating the disaster relief event, and in some embodiments in response to creating the disaster relief event, the system may be configured to create a temporary dialer file for use in contacting a plurality of customers in reference to customer accounts maintained by the entity. The dialer file may be additionally based on the one or more parameters of the disaster relief event. In some embodiments, the customer is contacted on behalf of the entity using an automated dialer (also referred to as an autodialer). The autodialer may be used to contact any telephone number assigned to a paging service, cellular telephone service, specialized mobile radio service, or other radio common carrier service, or any service for which the called party is charged for the call. An autodialer is a computerized and/or mechanical system for communicating with a contact, such as an autodialer for dialing phone numbers. Analogous systems for email, text messages, or the like may also be considered autodialers.

In some embodiments, a dialer file and/or call list comprising one or more telephone numbers associated with each of the customer is stored in the memory. As shown in FIG. 4, the dialer file may be further associated with customer accounts and accessible from within the user interface for creating disaster relief events. In such an embodiment, telephone numbers within the dialer file may be temporarily restricted from contact on behalf of the entity if the number and/or accounts are associated with the disaster relief event. The restriction of the telephone numbers may result in the creation of a temporary dialer file for use in contacting customers during the disaster relief event. The system may then automatically suspend contact to one or more customers in response to numbers being excluded from the temporary dialer file. In this way the autodialer does not have access to the telephone number for automated dialing, and a representative of the entity does not have access to view the telephone number for the purpose of manually dialing the customer.

In some embodiments creating the dialer file comprises the system being configured to determine to exclude a telephone number from the dialer file in response to determining the telephone number is associated with the disaster relief event. For example, the area code of the telephone number may be equivalent to a parameter that defines the location of the disaster relief event. In other embodiments, creating the dialer file comprises the system being configured to determine to exclude a telephone number from the dialer file in response to determining the account related to the telephone number is associated with the disaster relief event. For example, the state or postal code of the address related to the account may be equivalent to a parameter that defines the location of the disaster relief event.

In some embodiments creating a disaster relief event may further comprise the system being configured to maintain a record/history of the created disaster relief events such that the history is searchable by either the entity associated with the account, the customer, or a third party entity. As illustrated in FIG. 4, a disaster relief list tab 400 may be presented to the entity representative within the unified recovery application 200. The disaster relief list tab 400 may present a listed record of disaster relief events that have been previously created. The listed record may comprise various items and/or parameters of information including, but not limited to, identification numbers, disaster relief event names, disaster relief event descriptions, update time, user identification of the user that last updated the disaster relief event, and the like. The disaster relief list tab 400 may also comprise user input fields for receiving input that define search criteria for searching the disaster relief list. For example, the representative may input "to" and "from" dates that define a period of time for which disaster relief events from the disaster relief list should be presented. The system may be additionally configured to archive one or more disaster relief events in memory such the disaster relief list tab 400 comprises user input fields for specifying whether or not a disaster relief event record should be archived in memory, and specifying whether previously archived records should be included in search results.

Regarding block 130, after creating the temporary dialer file for use in contacting the plurality of customers in reference to the account, the system may be configured to automatically suspend contact to one or more customers based at least partially in response to the telephone numbers of the one or more customers being excluded from the temporary dialer file. As such in some embodiments, suspending contact to the customer on behalf of the entity may further comprise blocking the autodialer from dialing and/or messaging one or more phone numbers associated with the customer.

In some embodiments, the dialer file is generated prior to the beginning of the business day such that a customer may still be contacted if the disaster relief event is created after the dialer file has been generated for the day. In other embodiments, the dialer file is periodically regenerated throughout the day such that a customer may be potentially contacted during a period of time after the disaster relief event is created until the dialer file is regenerated and configured to exclude the telephone numbers and/or accounts associated with the disaster relief event. In yet another embodiment, the dialer file is automatically regenerated in response to the creation of the disaster relief event such that contact to the customer is immediately suspended in response to the request being received. In some embodiments, as shown in FIG. 5, the representative of the entity may be restricted from manually dialing the customer and/or prompted to not manually dial a customer by presenting the representative with one or more visual indicators within the unified application 200 that indicate the customer account or telephone number is associated with a disaster relief event and should therefore not be contacted. For example, the system may present the representative with a warning message 510, as illustrated in FIG. 5, indicating the customer telephone numbers and/or accounts have been associated with a disaster relief event and the representative is not permitted to contact the customer on behalf of the entity. The warning message may be presented prior to removing the telephone number from the call list and/or dialer file. The warning message 510 may provide the representative with various additional options. For example, the representative may request to receive additional information, acknowledge the warning, override the warning and continue initiating customer contact, or manually select to not contact the customer. In an instance the representative selects an option to override the warning and continue initiating customer contact, the representative may additionally provide reasoning for continuing customer contact via one or more user input fields (e.g. a drop down menu). As illustrated in FIG. 6, in some embodiments the representative may additionally manually suspend contact to the customer using a "stop dialing function" 520.

In some embodiments, the customer may have a plurality of accounts maintained by the entity (e.g. a first and a second account maintained by the entity) such that the disaster relief event is not associated with all of the accounts (e.g. only associated with the first account). As such, the disaster relief event may or may not be associated with every account that the customer has maintained by the entity, such that contact procedures associated with disaster relief events are implemented at an account level versus being implemented at a customer level. In such an embodiment at least one parameter associated with the disaster relief event may specify that the disaster relief event is only associated with a first account of the user such that the system may then automatically suspend contact to the customer by determining to not contact a customer based at least partially on determining the reason for contacting the customer is associated with the first account, and determining to contact a customer based at least partially on determining the reason for contacting the customer is associated with the second account. In this way the autodialer may be configured to determine on an individual account level whether or not a disaster relief event affects a specific account and further determine not to dial the one or more phone numbers associated with the specific account. As such, the different accounts may have similar and/or different phone numbers and contact information associated with them such that at least a portion of information is restricted from contact if associated with disaster relief event.

In some embodiments, a disaster relief event may specify time periods (e.g. times of days, weeks, months, quarters, years, and the like) in which customers are available and/or unavailable to be contacted based on the start and end dates associated with the disaster relief efforts. In such an embodiment at least one rule associated with the disaster relief event may specify a time period in which the customers are unable to be contacted. The system may then automatically suspend contact to the customer by restricting the entity from contacting the customer during the specified period of time. In this way the autodialer may be restricted from automatically dialing the customer during specific periods of times based on the rules, and a representative of the entity may be restricted from manually dialing the customer during specific periods of time. In some embodiments, a representative of the entity may be restricted from manually dialing the customer by disabling their phone or contact device from being able to dial the customer's numbers.

In some embodiments, as previously discussed, the system is further configured to remove and/or delete the disaster relief event associated with customers in the disaster relief area and having the at least one account maintained by an entity. In such an embodiment, the disaster relief event is deleted such that in response to deleting the disaster relief event, the system may automatically initiate contact to the customer on behalf of the entity based at least partially in response the customers being contacted based on the original dialer file and/or the customers telephone numbers being included in the temporary dialer file. In some embodiments, initiating contact to the customer on behalf of the entity may further comprise unblocking the autodialer from dialing and/or messaging one or more phone numbers associated with the customer. In some embodiments, initiating contact to the customer may comprise adding one or more telephone numbers to the dialer file such that after the telephone numbers are added to the dialer file the customer can be contacted at a specific telephone number on behalf of the entity. In some embodiments, the system may automatically initiate contact to the customer by removing any restrictions related to the entity contacting the customer during the specified period of time.

FIG. 7 provides a block diagram illustrating an exemplary financial institution banking system 700 in greater detail, in accordance with embodiments of the invention. The banking system 700 may be the entity system that provides for the system and method disclosed in FIG. 1. As illustrated in FIG. 7, in one embodiment of the invention, the banking system 700 includes a processing device 720 operatively coupled to a network communication interface 710 and a memory device 750. In certain embodiments, the banking system 700 is operated by a first entity, such as a financial institution, while in other embodiments the banking system 700 is operated by an entity other than a financial institution.

It should be understood that the memory device 750 may include one or more databases or other data structures/repositories. The memory device 750 also includes computer-executable program code that instructs the processing device 720 to operate the network communication interface 710 to perform certain communication functions of the banking system 700 described herein. For example, in one embodiment of the banking system 700, the memory device 750 includes, but is not limited to, a network server application 770, a customer account data repository 780, which includes customer account information 784, a decision engine 790, an event monitoring routine 792, and other computer-executable instructions or other data. The computer-executable program code of the network server application 770 or the event monitoring routine 792 may instruct the processing device 720 to perform certain logic, data-processing, and data-storing functions of the banking system 700 described herein, as well as communication functions of the banking system 700.

In an embodiment, the customer account data repository 780 includes customer account information 784. The customer account information may include account history for the customer, demographic information for the customer, any notations made by the customer or a representative on the customer's file, and the like.

In some embodiments, the event monitoring routine 792 facilitates monitoring of disaster relief events associated with customer accounts. In an embodiment, the event monitoring routine 792 tracks when to discontinue using a contact to communicate with the customer via one or more channels. For example, the event monitoring routine 792 may identify when a disaster relief event has been created, based on the system and method disclosed in FIG. 1, and associate the customer account with the disaster relief event.

As used herein, a "communication interface" generally includes a modem, server, transceiver, and/or other device for communicating with other devices on a network, and/or a user interface for communicating with one or more users. Referring again to FIG. 7, the network communication interface 710 is a communication interface having one or more communication devices configured to communicate with one or more other devices on the network, such as a representative work station, an autodialer, a customer contact, and the banking system 700. The processing device 720 is configured to use the network communication interface 710 to transmit and/or receive data and/or commands to and/or from the other devices connected to a network to allow communication between the devices.

FIG. 8 provides a block diagram illustrating technical components for a system 800, in accordance with an embodiment of the present disclosure. As illustrated, the system 800 includes a customer 810, an entity computer platform 820, a representative workstation 830 for a representative 812 and a network 840. It will be understood that the representative 812 has access to the representative workstation 830.

As shown in FIG. 8, the entity computer platform 820 and representative workstation 830 are each operatively and selectively connected to the network 840, which may include one or more separate networks. In addition, the network 840 may include a local area network (LAN), a wide area network (WAN), and/or a global area network (GAN), such as the Internet. It will also be understood that the network 840 may be secure and/or unsecure and may also include wireless and/or wireline technology. The network 840 may be used to communicate with the customer 810 via the contact.

As shown in FIG. 8, in accordance with some embodiments of the present invention, the representative workstation 830 includes a communication interface 832, a processor 833, a memory 834 having a pop-up routine 835 stored therein, an autodialer or a connection to an autodialer 836, and a user interface 837. In such embodiments, the communication interface 832 is operatively and selectively connected to the processor 833, which is operatively and selectively connected to the user interface 837, the memory 834 and the autodialer 836.

The user interface 837 may allow the representative workstation 830 to receive data from the customer 810. In an embodiment, the representative workstation 830 may include any of a number of devices allowing the representative 812 to control the representative workstation 830 and communicate with the customer 850, such as a keypad, keyboard, touch-screen, touchpad, microphone, mouse, joystick, stylus, other pointer device, button, soft key, and/or other input device(s). In some embodiments, the user interface 837 also includes one or more user output devices, such as a display and/or speaker, for presenting information to the representative 812.

Each communication interface described herein, including the communication interface 832 and 822, generally includes hardware, and, in some instances, software, that enables a portion of the system 800, such as the processor 833 to transport, send, receive, and/or otherwise communicate information. For example, the communication interface 832 of the representative workstation 830 may include a modem, server, electrical connection, and/or other electronic device that operatively connects the representative workstation 830 to another electronic device, such as the electronic devices that make up the entity computer platform 820 and/or the electronic device of the customer 810.

Each processor described herein, including the processor 833 and 824, generally includes circuitry for implementing the audio, visual, and/or logic functions of that portion of the system 800. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as the memory 834 of the representative workstation 830 and the memory 826 of the entity computer platform 820.

Each memory device described herein, including the memory 834 for storing the pop-up routine 835 and the memory 826 of the entity computer platform 820, may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 8, the memory 834 of the representative workstation 830 includes the pop-up routine 835. The pop-up routine 835 provides alerts and/or information to the representative relating to the customer, the contact, or the call. For example, the pop-up routine may determine that the customer resides in a state having restrictions on certain questions during a phone call from a financial institution. The pop-up routine would display a special screen before or during the communication with the customer providing information on the restrictions. In some embodiments, the pop-up routine 835 includes computer-executable program code portions for instructing the processor 833 to perform one or more of the functions of the pop-up routine 835 described and/or contemplated herein.

It will be understood that the representative workstation 830 can be configured to implement one or more portions of the process flows described and/or contemplated herein. For example, in some embodiments, the representative workstation 830 is configured so that the communication interface 832 is operatively and selectively linked to the entity computer platform 820 to receive autodialing campaigns or connect to an autodialer. For instance, information regarding the customers that will be contacted during an autodialing campaign, e.g. contacts, account history, or the like. In other embodiments (not shown) an application may be stored in the memory 834 of the representative workstation 830 that enables the workstation to perform some or all of the steps of process flow 100.

FIG. 8 also illustrates a entity computer platform 820, in accordance with an embodiment of the present invention. The entity computer platform 820 may include any computerized apparatus that can be configured to perform any one or more of the functions of the entity computer platform 820 described and/or contemplated herein. In accordance with some embodiments, for example, the entity computer platform 820 may include an engine, a platform, a server, a database system, a front end system, a back end system, a personal computer system, and/or the like. In some embodiments, such as the one illustrated in FIG. 8, the entity computer platform 820 includes a communication interface 822, a processor 824 and a memory 826. In some embodiments, as illustrated in FIG. 8, customer data (such as contacts, transactional data, account history data, social network data and Internet data) 827, a decision engine 828, and an autodialing routine 829 may be stored in memory 826. The customer data 827 may have been previously collected and stored in the memory 826 of the entity computer platform 820, or the entity computer platform may actively collect customer data 827 by using the communication interface 822 to access the network 840 and only temporarily saves the customer data 827 to the memory to be accessed by the processor 824. The communication interface 822 is operatively and selectively connected to the processor 824, which is operatively and selectively connected to the memory 826.

It will be understood that the entity computer platform 820 can be configured to implement one or more portions of the process flows described and/or contemplated herein. For example, in some embodiments, the entity computer platform 820 is configured so that the processor uses a decision engine to determine whether a disaster relief event has been created and then instructs the autodialer whether or not to communicate with the customer via the contact. In certain embodiments the autodialing routine 829, stored in memory 826, is configured to control an autodialer. The autodialer may be integral with the system or may be external to the system yet connected over the network 840. In yet other embodiments, the decision engine 828 stored in memory 826 is configured to determine if a disaster relief event is needed and, if so, determine if the disaster relief event has been created.

It will be understood that the embodiment illustrated in FIG. 8 is exemplary and that other embodiments may vary. For example, in some embodiments, some or all of the portions of the system 800 may be combined into single portion. Specifically, in some embodiments, the entity computer platform 820 is configured to perform all of the same functions of those separate portions as described and/or contemplated herein. Likewise, in some embodiments, some or all of the portions of the system 800 may be separated into two or more distinct portions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer.

Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer program product for temporarily suspending customer contact associated with disaster relief events, the computer program product embodied on a non-transitory computer readable storage medium having computer readable program code embodied therewith, the computer readable program code comprising:
   a computer readable program code configured to receive information regarding a disaster relief event;
   a computer readable program code configured to create a disaster relief event file associated with a plurality of customer accounts maintained by an entity, wherein the disaster relief event file comprises one or more parameters associated with the disaster relief event, wherein at least one customer has a first and a second account maintained by the entity, and wherein the disaster relief event is only associated with a first account associated with the at least one customer;
   a computer readable program code configured to automatically suspend contact to one or more customers based at least partially in response to a telephone number of the one or more customer being excluded from a temporary dialer file, wherein automatically suspending contact comprises:
      determining to not contact the at least one customer using the telephone number associated with the customer based at least partially on determining a reason for contacting the at least one customer is associated with the first account; and
      determining to contact the at least one customer using the telephone number associated with the customer based at least partially on determining the reason for contacting the customer is associated with the second account; and
   a computer readable program code configured to create the temporary dialer file for use in contacting the plurality of customers in reference to the accounts, wherein the temporary dialer file is based at least partially on the one or more parameters of the disaster relief event, and wherein creating the temporary dialer file comprises:
      determining to exclude the telephone number associated with the at least one customer, from the temporary dialer file at least partially in response to determining that the reason for contacting the customer is associated with the first account which is associated with the disaster relief event;
      determining to include the telephone number associated with the at least one customer in the temporary dialer file at least partially in response to determining the telephone number is associated with the second account that is not related to the disaster relief event.

2. The computer program product of claim 1 further comprising computer readable program code configured to determine to not automatically suspend contact to one or more customers based at least partially on a delinquency stage or product type of the customer accounts.

3. The computer program product of claim 2, wherein determining to not automatically suspend contact to one or more customers based at least partially the delinquency stage or product type of the customer accounts further comprises:
   determining to not exclude a telephone number from the dialer file in response to determining an account related to the telephone number is a predetermined number of days in payment arrears or associated with a predetermined product type.

4. The computer program product of claim 1 further comprising computer readable program code configured to present, to a user, a warning message associated with the disaster relief event, wherein the warning message indicates at least one customer telephone number or account has been associated with the disaster relief event, and wherein the warning is presented on a user interface associated with the user.

5. The computer program product of claim 4, wherein the computer readable program code configured to present, to a user, a warning message associated with the disaster relief event is configured to allow the user to:
   request, via the user interface, to receive additional information related to the disaster relief event,
   acknowledge, via the user interface, that the warning was received,
   override, via the user interface, the warning message and not automatically suspend contact to one or more customers, or
   manually select, via the user interface, to automatically suspend contact to one or more customers.

6. The computer program product of claim 1, wherein the entity contacts the customer using an automated dialer, and wherein the computer readable program code configured to automatically suspending contact to the customer on behalf of the entity comprises code for:
   blocking the automated dialer from dialing one or more telephone numbers associated with the customer.

7. The computer program product of claim 6, wherein a non-temporary dialer file comprising the one or more telephone numbers associated with the customer is stored in a memory, and wherein the computer readable program code configured for creating the temporary dialer file comprises code configured for removing one or more telephone numbers from the non-temporary dialer file such that after removing the one or more telephone numbers from the non-temporary dialer file the plurality of customers cannot be contacted at the one or more telephone numbers on behalf of the entity.

8. The computer program product of claim 1 further comprising computer readable program code configured to provide a user interface for creating the disaster relief event, and wherein the user interface is configured to automatically import information into at least one user input field within a user interface, and wherein the imported information is in an aggregated format.

9. The computer program product of claim 1 further comprising computer readable program code configured to:
   receive, via user input into a user interface, a request to delete the disaster relief event associated with a customer having the at least one account maintained by an entity; and in response to receiving the request to delete the disaster relief event, automatically initiate contact to the customer on behalf of the entity.

10. A computer implemented method for temporarily suspending customer contact associated with disaster relief events, the method comprising:

receiving information regarding a disaster relief event;

creating a disaster relief event file associated with a plurality of customer accounts maintained by an entity, wherein the disaster relief event file comprises one or more parameters associated with the disaster relief event, wherein at least one customer has a first and a second account maintained by the entity, and wherein the disaster relief event is only associated with the first account associated with the at least one customer;

automatically suspending contact to one or more customers based at least partially in response to a telephone number of the one or more customer being excluded from a temporary dialer file, wherein automatically suspending contact comprises:

determining to not contact the at least one customer using the telephone number associated with the customer based at least partially on determining a reason for contacting the at least one customer is associated with the first account; and determining to contact the at least one customer using the telephone number associated with the customer based at least partially on determining the reason for contacting the customer is associated with the second account;

creating the temporary dialer file for use in contacting the plurality of customers in reference to the accounts, wherein the temporary dialer file is based at least partially on the one or more parameters of the disaster relief event, and wherein creating the temporary dialer file comprises:

determining to exclude the telephone number associated with the at least one customer, from the temporary dialer file at least partially in response to determining that the reason for contacting the customer is associated with the first account which is associated with the disaster relief event;

determining to include the telephone number associated with the at least one customer in the temporary dialer file at least partially in response to determining the telephone number is associated with the second account that is not related to the disaster relief event.

11. The computer implemented method of claim 10 further comprising determining to not automatically suspend contact to one or more customers based at least partially on a delinquency stage or product type of the customer accounts.

12. The computer implemented method of claim 11, wherein determining to not automatically suspend contact to one or more customers based at least partially the delinquency stage or product type of the customer accounts further comprises:

determining to not exclude a telephone number from the dialer file in response to determining an account related to the telephone number is a predetermined number of days in payment arrears or associated with a predetermined product type.

13. The computer implemented method of claim 10 further comprising presenting, to a user, a warning message associated with the disaster relief event, wherein the warning message indicates at least one customer telephone number or account has been associated with the disaster relief event, and wherein the warning is presented on a user interface associated with the user.

14. The computer implemented method of claim 13 further comprising allowing the user to:

request, via the user interface, to receive additional information related to the disaster relief event, acknowledge, via the user interface, that the warning was received, override, via the user interface, the warning message and not automatically suspend contact to one or more customers, or manually select, via the user interface, to automatically suspend contact to one or more customers.

15. The computer implemented method of claim 10, wherein the entity contacts the customer using an automated dialer, and wherein automatically suspending contact to the customer on behalf of the entity comprises:

blocking the automated dialer from dialing one or more telephone numbers associated with the customer.

16. The computer implemented method of claim 15, wherein a non-temporary dialer file comprising the one or more telephone numbers associated with the customer is stored in a memory, and wherein creating the temporary dialer file comprises removing one or more telephone numbers from the non-temporary dialer file such that after removing the one or more telephone numbers from the non-temporary dialer file the plurality of customers cannot be contacted at the one or more telephone numbers on behalf of the entity.

17. The computer implemented method of claim 10 further comprising providing a user interface for creating the disaster relief event, and wherein the user interface is configured to automatically import information into at least one user input field within a user interface, and wherein the imported information is in an aggregated format.

18. The computer implemented method of claim 10 further comprising:

receiving, via user input into a user interface, a request to delete the disaster relief event associated with a customer having the at least one account maintained by an entity; and in response to receiving the request to delete the disaster relief event, automatically initiating contact to the customer on behalf of the entity.

\* \* \* \* \*